US008219447B1

(12) United States Patent
Ieong et al.

(10) Patent No.: US 8,219,447 B1
(45) Date of Patent: Jul. 10, 2012

(54) REAL-TIME ADAPTIVE PROBABILISTIC SELECTION OF MESSAGES

(75) Inventors: Ion T. Ieong, Issaquah, WA (US); Christopher R. Barkley, Seattle, WA (US); Matthew O. Anderson, Bainbridge Island, WA (US); Richard Hansen Wolniewicz, Longmont, CO (US)

(73) Assignee: Amazon Technologies, Inc., Reno, NV (US)

( * ) Notice: Subject to any disclaimer, the term of this patent is extended or adjusted under 35 U.S.C. 154(b) by 1078 days.

(21) Appl. No.: 11/758,932

(22) Filed: Jun. 6, 2007

(51) Int. Cl.
G06Q 30/00 (2006.01)

(52) U.S. Cl. ................................... 705/14.43

(58) Field of Classification Search .............. 705/14
See application file for complete search history.

(56) References Cited

U.S. PATENT DOCUMENTS

| 5,446,891 | A | 8/1995 | Kaplan et al. |
| 5,749,081 | A | 5/1998 | Whiteis |
| 5,774,123 | A | 6/1998 | Matson |
| 5,825,651 | A | 10/1998 | Gupta et al. |
| 5,848,396 | A | 12/1998 | Gerace |
| 5,870,559 | A | 2/1999 | Leshem et al. |
| 5,958,008 | A | 9/1999 | Pogrebisky et al. |
| 6,012,051 | A | 1/2000 | Sammon et al. |
| 6,085,229 | A | 7/2000 | Newman et al. |
| 6,256,633 | B1 | 7/2001 | Dharap |
| 6,317,722 | B1 | 11/2001 | Jacobi et al. |
| 6,321,221 | B1 | 11/2001 | Bieganski |
| 6,334,127 | B1 | 12/2001 | Bieganski et al. |
| 6,438,579 | B1 | 8/2002 | Hosken |
| 6,466,970 | B1 | 10/2002 | Lee et al. |
| 6,473,794 | B1 | 10/2002 | Guheen et al. |
| 6,493,702 | B1 | 12/2002 | Adar et al. |
| 6,606,102 | B1 | 8/2003 | Odom |
| 6,636,836 | B1 | 10/2003 | Pyo |
| 6,654,725 | B1 * | 11/2003 | Langheinrich et al. .... 705/14.52 |
| 6,658,568 | B1 | 12/2003 | Ginter et al. |

(Continued)

FOREIGN PATENT DOCUMENTS

WO    WO 95/29451 A1    11/1995

(Continued)

OTHER PUBLICATIONS

Yager, Ronald. "Intelligent Agents for World Wide Web Advertising Decisions," Machine Intelligence Institute, 1997.*

(Continued)

*Primary Examiner* — C. M. Tarae
(74) *Attorney, Agent, or Firm* — Knobbe Martens Olson & Bear LLP

(57) ABSTRACT

A facility selects a unit of content to include in an instance of a content container. For each of a plurality of units of content, across a plurality of other instances of the content container distributed during a foregoing period of time that included the unit of content, the facility determines both an average level of success achieved by including the unit of content, and a measure of the level of variability of the level of success achieved by including the unit of content. The facility scores each unit of content by selecting a value from a probability distribution that is based on the determined average level of success and measure of the level of variability of the level of success. The facility selects one of the units of content to include in the instance of the content container based on the determined scores.

21 Claims, 9 Drawing Sheets

U.S. PATENT DOCUMENTS

| | | | |
|---|---|---|---|
| 6,735,572 | B2 | 5/2004 | Landesmann |
| 6,873,967 | B1 | 3/2005 | Kalagnanam et al. |
| 6,901,378 | B1 | 5/2005 | Linker et al. |
| 7,016,864 | B1 | 3/2006 | Notz et al. |
| 7,031,961 | B2 | 4/2006 | Pitkow et al. |
| 7,089,237 | B2 | 8/2006 | Turnbull et al. |
| 7,295,995 | B1 | 11/2007 | York et al. |
| 7,542,951 | B1 | 6/2009 | Chakrabarti et al. |
| 7,720,723 | B2 | 5/2010 | Dicker et al. |
| 2001/0011235 | A1 | 8/2001 | Kim et al. |
| 2001/0014868 | A1 | 8/2001 | Herz et al. |
| 2002/0019763 | A1 | 2/2002 | Linden et al. |
| 2002/0046099 | A1 | 4/2002 | Frengut et al. |
| 2002/0062247 | A1* | 5/2002 | Allen ............... 705/14 |
| 2002/0082923 | A1 | 6/2002 | Merriman et al. |
| 2002/0184139 | A1 | 12/2002 | Chickering et al. |
| 2002/0198882 | A1 | 12/2002 | Linden et al. |
| 2003/0004781 | A1 | 1/2003 | Mallon et al. |
| 2003/0074252 | A1 | 4/2003 | Chandler-Pepelnjak et al. |
| 2003/0101451 | A1 | 5/2003 | Bentolila et al. |
| 2003/0105682 | A1 | 6/2003 | Dicker et al. |
| 2003/0229531 | A1* | 12/2003 | Heckerman et al. ......... 705/10 |
| 2004/0054572 | A1* | 3/2004 | Oldale et al. ......... 705/10 |
| 2004/0172267 | A1 | 9/2004 | Patel et al. |
| 2005/0038717 | A1 | 2/2005 | McQueen, III et al. |
| 2005/0091245 | A1 | 4/2005 | Chickering et al. |
| 2006/0184357 | A1 | 8/2006 | Ramsey et al. |
| 2006/0206516 | A1 | 9/2006 | Mason |
| 2007/0156621 | A1* | 7/2007 | Wright et al. ......... 706/48 |
| 2007/0156887 | A1* | 7/2007 | Wright et al. ......... 709/224 |
| 2007/0198337 | A1 | 8/2007 | Coon |
| 2008/0086444 | A1 | 4/2008 | Yu et al. |
| 2010/0050201 | A1* | 2/2010 | Kubota et al. ......... 725/12 |

FOREIGN PATENT DOCUMENTS

| | | |
|---|---|---|
| WO | WO 99/41694 A1 | 8/1999 |
| WO | WO 00/17792 A1 | 3/2000 |

OTHER PUBLICATIONS

Anderson, C., et al., Personalizaing Web Sites for Mobile Users, AMC Press, The Tenth International World Wide Web Conference, pp. 565-575, 2001.

Andersen, J., et al., Analyzing Clickstreams Using Subsessions, Proceedings of the Third ACM International Workshop on Data Warehousing and OLAP, pp. 25-32, ACM Press, 2000.

Dicker, R.A., Adaptive Learning Methods for Selecting Web Page Components for Inclusion in Web Pages, U.S. Appl. No. 10/393,505, filed Mar. 19, 2003.

Kohavi, R., Mining E-Commerce Data: The Good, The Bad, and The Ugly, Proceedings of the Seventh ACM SIGKDD International Conference on Knowledge Discovery and Data Mining, pp. 8-13, ACM Press, 2001.

Langheinrich, M., et al., Unintrusive Customization Techniques for Web Advertising, pp. 1-19, printed Feb. 1, 2002 from http://www8.org/w8-papers/2b-customizing/unintrusive/unintrusive.html.

Middleton, S., et al., Capturing Knowledge of User Preferences: Ontologies in Recommender Systems, Proceedings of the International Conference on Knowledge Capture, pp. 100-107, ACM Press 2001.

Mobasher, B., et al., Automatic Personalization Based on Web Usage Mining, Communications of the ACM, 43(8)142-151, 2000.

Rossi, G., et al., Designing Personalized Web Applications, ACM Press, The Tenth International World Wide Web Conference, pp. 275-284, 2001.

Schwab, P., and Koychev, Learning to Recommend from Positive Evidence, ACM Press, Proceedings of the 2000 International Conference on Intelligent User Interfaces, New Orleans, Louisiana, pp. 241-247, 2000.

VanderMeer, D., et al. Enabling Scalable Online Personalization on the Web, ACM Press, Proceedings of the $2^{nd}$ ACM Conference on Electronic Commerce, pp. 185-196, 2000.

Widyantoro, D., et al., An Adaptive Algorithm for Learning Changes in User Interests, Proceedings of the Eighth International Conference on Information Knowledge Management, pp. 405-412, ACM Press 1999.

Yu, K., Selecting Relevant Instances for Efficient and Accurate Collaborative Filtering, Proceedings of the Tenth International Conference on Information and Knowledge Management, pp. 239-246, ACM Press 2001.

* cited by examiner

REAL-TIME ADAPTIVE PROBABILISTIC SELECTION OF MESSAGES

TECHNICAL FIELD

The described technology is directed to the field of providing electronic content, and, more particularly, to the field of optimized message selection.

BACKGROUND

Web publishers often include advertising messages in the web pages that they serve to users. Such advertising messages may either be for the benefit of an advertiser other than the publisher, or may promote products or services sold by the publisher. For example, an online merchant may include on its web pages advertisements promoting products or services sold by the online merchant.

It is typical for each page served by a publisher to have a number of "slots" (also referred to herein as distinguished locations) that each may contain an advertising message. It is frequently true that, for each slot, several different advertising messages are eligible to be included in that slot, such that the publisher may select any of these eligible advertising messages to include in the display. It is common for a publisher to select from among the advertising messages eligible for a particular slot the advertising message expected to have the greatest value to the publisher, such as the advertising message expected to produce the greatest measure of revenue and/or profit for the publisher.

It is common to determine the level of revenue and/or profit each eligible advertising message is expected to produce by dividing the total revenue and/or profit that the advertising message has produced when included in a slot during a foregoing period of time by the number of times the advertising message has been included in the display during that period to obtain a "mean value" or "expected value" for the advertising message in the slot. This approach often provides a useful basis for selecting an eligible advertising message to include in a slot where each eligible message has been included in the display (1) a statistically significant number of times (2) under relevant conditions that are similar to those present at the time the slot is being filled. Where this situation does not exist, however, one or more of the advertising messages may be misvalued based upon a scarcity of representative experience with the advertising message, causing the publisher to select an advertising message other than the optimal advertising message and adversely affect its overall results.

In some cases, to counter this limitation of the expected value approach to selecting a message, publishers have used a modified approach where opportunities to present a message in a particular slot are allocated to one of two modes: a fixed percentage of opportunities are allocated to an "exploitation" mode that uses the expected value approach to selecting a message described above, while the remaining fixed percentage of opportunities are allocated to an "experimentation" mode that seeks to increase the number of times that underexposed advertising messages are included in the display, in order to obtain a more reliable valuation of these messages.

DETAILED DESCRIPTION

Figure 1:
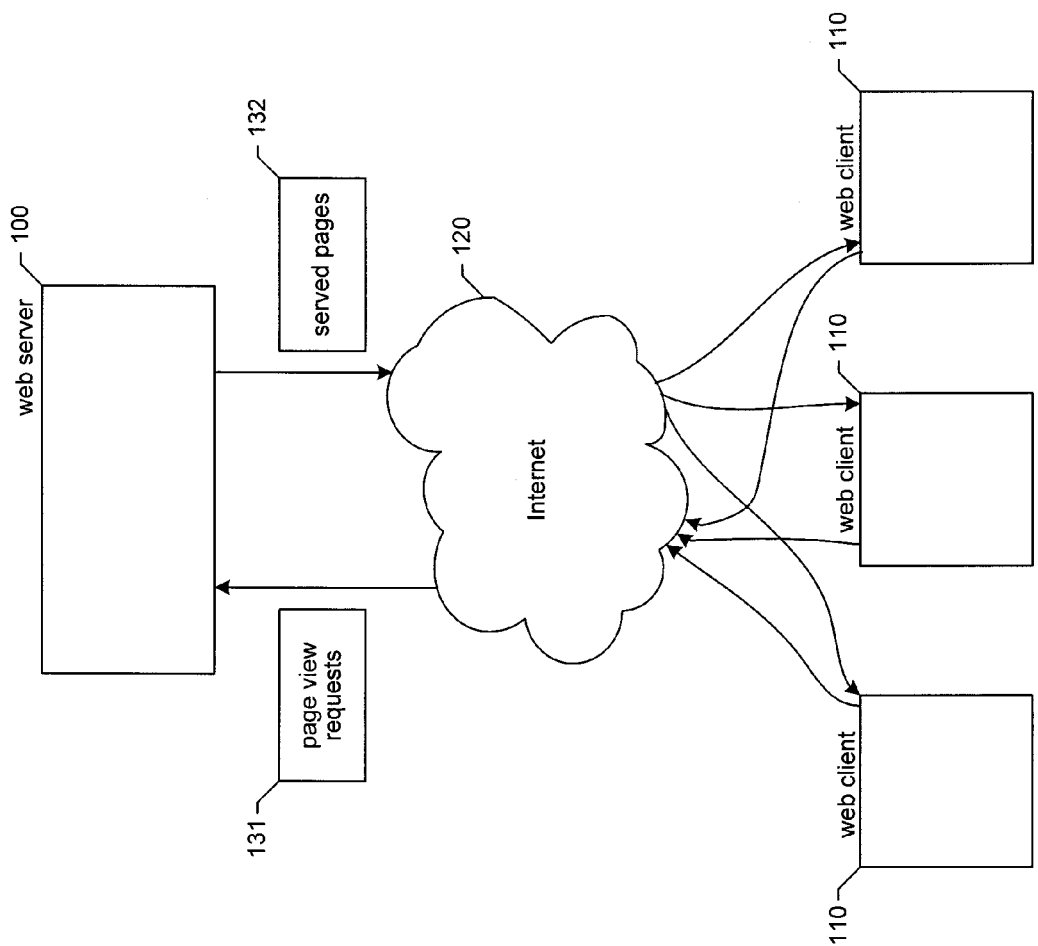
FIG. 1 is a high-level data flow diagram showing data flow within a typical arrangement of components used to provide the facility.

Applicants have recognized that the modal exploitation/experimentation approach to selecting advertising messages described above has the disadvantage that the fixed percentage of opportunities that are allocated to experimentation versus exploitation is, at any particular moment, very likely to differ from the optimal percentage. Accordingly, they have developed an approach to selecting messages that does not rely on allocating a fixed percentage of opportunities to each of an exploitation mode and a separate experimentation mode.

A software facility ("the facility") is described that seeks to optimize the selection of advertising messages or other content using probabilistic techniques. For each message that is eligible to be included in a particular slot in a particular served instance of a page, the facility generates an inclusion score by randomly selecting a value from a probability distribution—such as a normal distribution—corresponding to the combination of the message and the slot. In particular, the normal distribution is based on the message's history of being presented in the slot: the normal distribution is centered on the mean value for the message in the slot, and its breadth—that is, the number of standard deviations represented by the normal distribution—is generally inversely related to the number of exposures that the message has had in the slot during a foregoing time period, such that a first message that has had less exposure in the slot than a second message typically has a wider normal distribution than the second message. The probabilistic selection of an inclusion score employed by the facility weights each possible value in accordance with the height of the normal distribution at that value, such that the likelihood of selecting a value near the center of a normal distribution is greater than selecting a value further from the center of that normal distribution. The facility ranks the messages based upon their inclusion scores. The facility then proceeds to select eligible messages in decreasing order of their inclusion scores. This approach is well-adapted to resolving a selection between a set of candidates whose membership may vary frequently based upon which advertising messages are eligible to be included in a particular slot in a particular served instance of a page. Indeed, the approach used by the facility can be successful at selecting among sets of candidate messages whose membership is different in every iteration.

In some embodiments, the facility generates inclusion scores for a slot in a manner that seeks to satisfy guarantees established for one or more messages. Such guarantees each specify a minimum percentage of a slot's exposures that should include a particular message. For example, a guarantee may specify that a particular message be included in a particular slot for 20% of the slot's total exposures. The facility seeks to satisfy guarantees by establishing, for each guaranteed message, a guarantee bonus that is added to inclusion scores determined for the guaranteed message in the slot that is the subject of the guarantee. The facility then uses these augmented inclusion scores in its comparison of the inclusion scores of candidate messages. In some embodiments, the facility dynamically determines a guarantee bonus for each guarantee that is large enough to satisfy the guarantee, but not much larger. In particular, the facility may adjust a guarantee bonus level earlier determined for the message based upon the rate at which a message has been exposed in the slot while subject to that guarantee bonus level.

In some embodiments, the facility automatically attributes to new messages having no or limited exposure history in a slot seed values that cause the facility to select these new messages at a moderate rate and establish an actual history, which is later used as a basis for selecting these messages. In some cases, the facility determines a seed value for a new message in a way that is sensitive to details of messages with which the new message will compete for the current slot of the current page instance.

In some embodiments, the facility decays the histories it maintains in order to deemphasize past message performance that may no longer be representative of current performance. In some embodiments, the facility applies a variable decay rate obtained by simulating the operation of the facility at different decay rates, and choosing the decay rate whose simulation produces the highest overall value.

By selecting messages in some or all of the ways identified above, the facility frequently produces a high overall value, while satisfying exposure guarantees, and adjusting to new message-slot combinations and trends in the value of a message in a slot.

FIG. 1 is a high-level data flow diagram showing data flow within a typical arrangement of components used to provide the facility. A number of web client computer systems 110 that are under user control generate and send page view requests 131 to a logical web server 100 via a network such as the Internet 120. These requests typically include page view requests for web pages that may each contain one or more slots for including messages. Within the web server, these requests may either all be routed to a single web server computer system, or may be load-balanced among a number of web server computer systems. The web server typically replies to each with a served page 132.

While various embodiments are described in terms of the environment described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used in place of the web client computer systems, such as mobile phones, personal digital assistants, televisions, cameras, etc.

Figure 2:
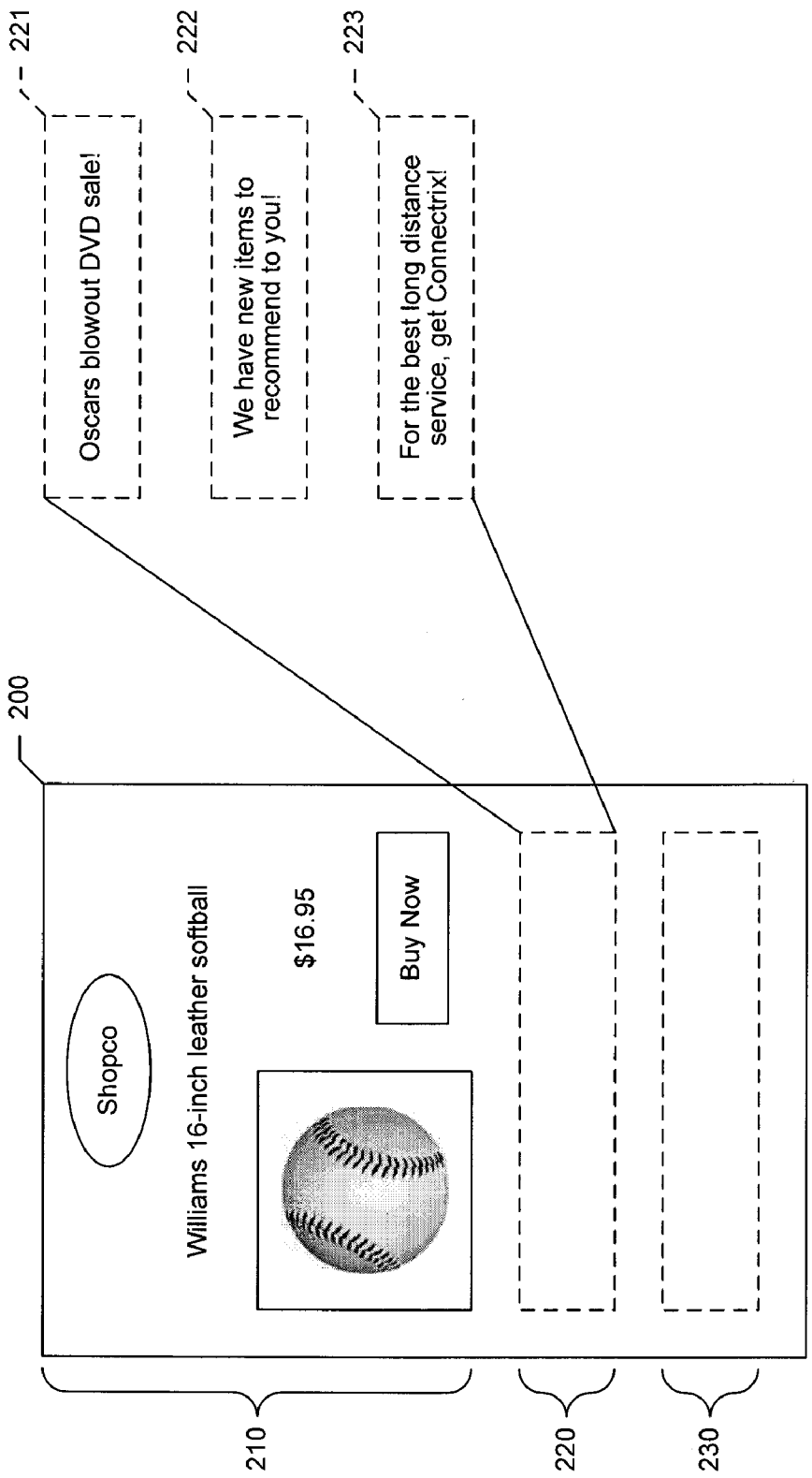
FIG. 2 is a conceptual diagram showing a typical served page.

FIG. 2 is a conceptual diagram showing a typical served page. The sample page 200 contains certain content that is native to all instances of the page, such as native content 210 describing a softball item that is available for purchase. The page further contains two slots 220 and 230, each of which can contain a message selected by the facility. Three sample messages 221-223 are shown that are candidate messages for slot 220. In some embodiments, the facility identifies these candidate messages from a larger pool of messages scheduled into slot 220 based on one or more preliminary eligibility tests, which can be based on such factors as the time of day, day of week, user identity, user characteristics, user behavior, etc. Slot 230 may have a different set of candidate messages, depending on how messages have been scheduled into these slots.

When an instance of the page containing one of the three candidate messages 221-223 in slot 220 is served to a user, the facility increments a count of the number of times that each message is included in display 220 during the current tracking period. In the served page instance, the user may select the message to obtain additional information about the subject of the message. After selecting the message, the user may go on to perform various actions related to the subject of the message, such as purchasing an item, entering a contest, or recommending an item to another user. The operator of the facility may ascribe a value to any of these actions resulting from a message selection. If the publisher of the page is an online merchant, the value ascribed to an action resulting from message selection may be the level of revenue or profit that the publisher expects to derive from the action, such as the level of revenue or profit that the publisher expects to derive from an item purchase.

If the message is associated with a third-party advertiser, the ascribed value may correspond to an amount of money that the advertiser has agreed to pay the publisher when a message is selected, or when an action is performed. Alternatively, the ascribed value may correspond to a level of desirability of the action to the publisher or another party that is determined without reference to any pecuniary value of the action. For example, a publisher who regards a user's provision of their postal address to be twice as useful as the user's provision of their email address may ascribe a value of $2.00 to the provision of a postal address and a value of $1.00 to the provision of an email address. If the user performs any of these actions, the facility augments a balance of a total value the message has produced when displayed in display 220 during the current tracking period. The count of the number of times the message has been included in slot 220 and the balance of the total value that message has produced when displayed in slot 220 forms the basis used by the facility to score this message for future inclusion in slot 220.

Figure 3:
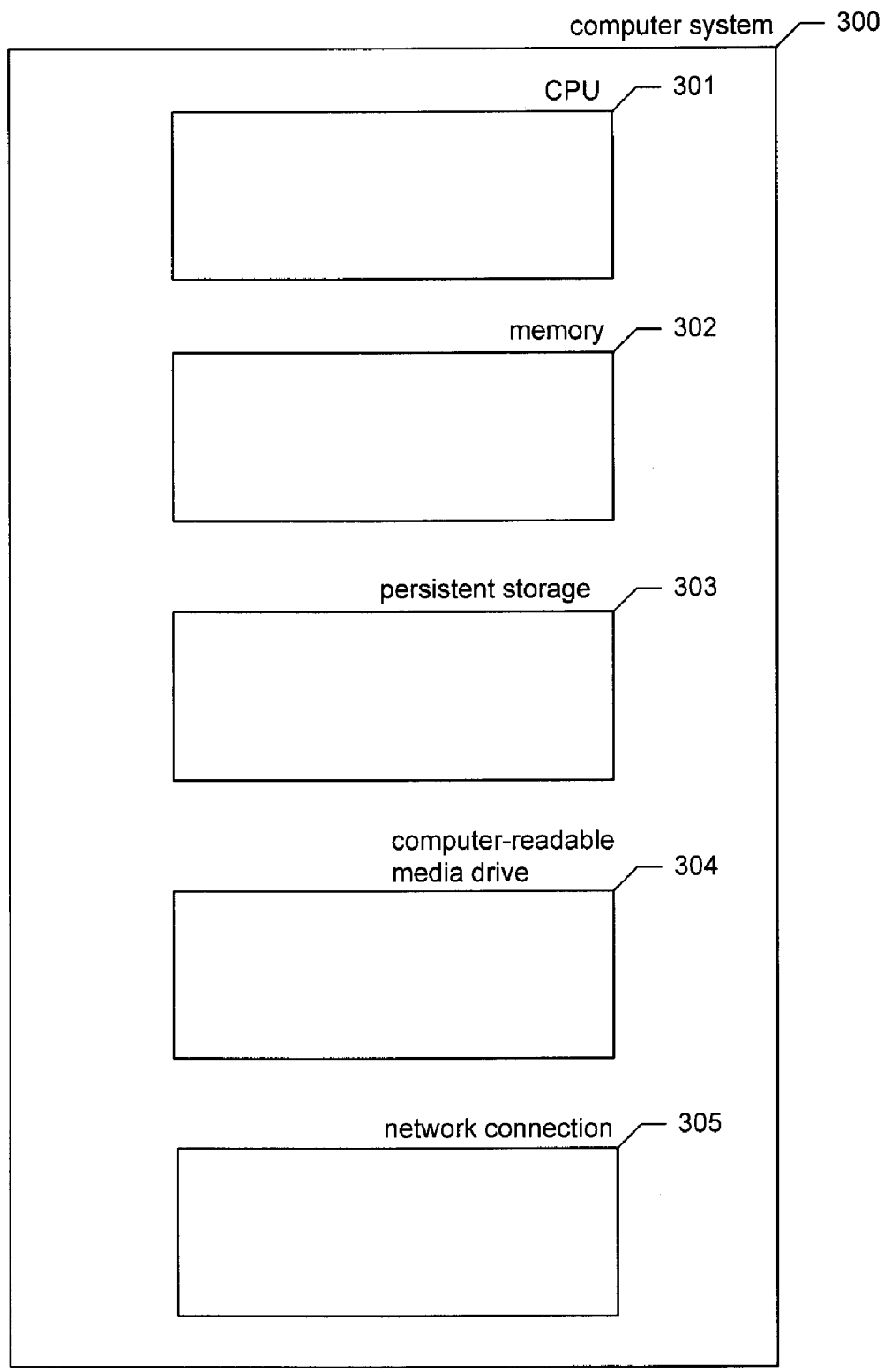
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data while they are being used; a persistent storage device 303, such as a hard drive for persistently storing programs and data; a computer-readable media drive 304, such as a floppy, CD-ROM, or DVD drive, for reading programs and data stored on a computer-readable medium; and a network connection 305 for connecting the computer system to other computer systems, such as via the Internet. While computer systems configured as described above are typically used to support the operation of the facility, those skilled in the art will appreciate that the facility may be implemented using devices of various types and configurations, and having various components.

Figure 4:
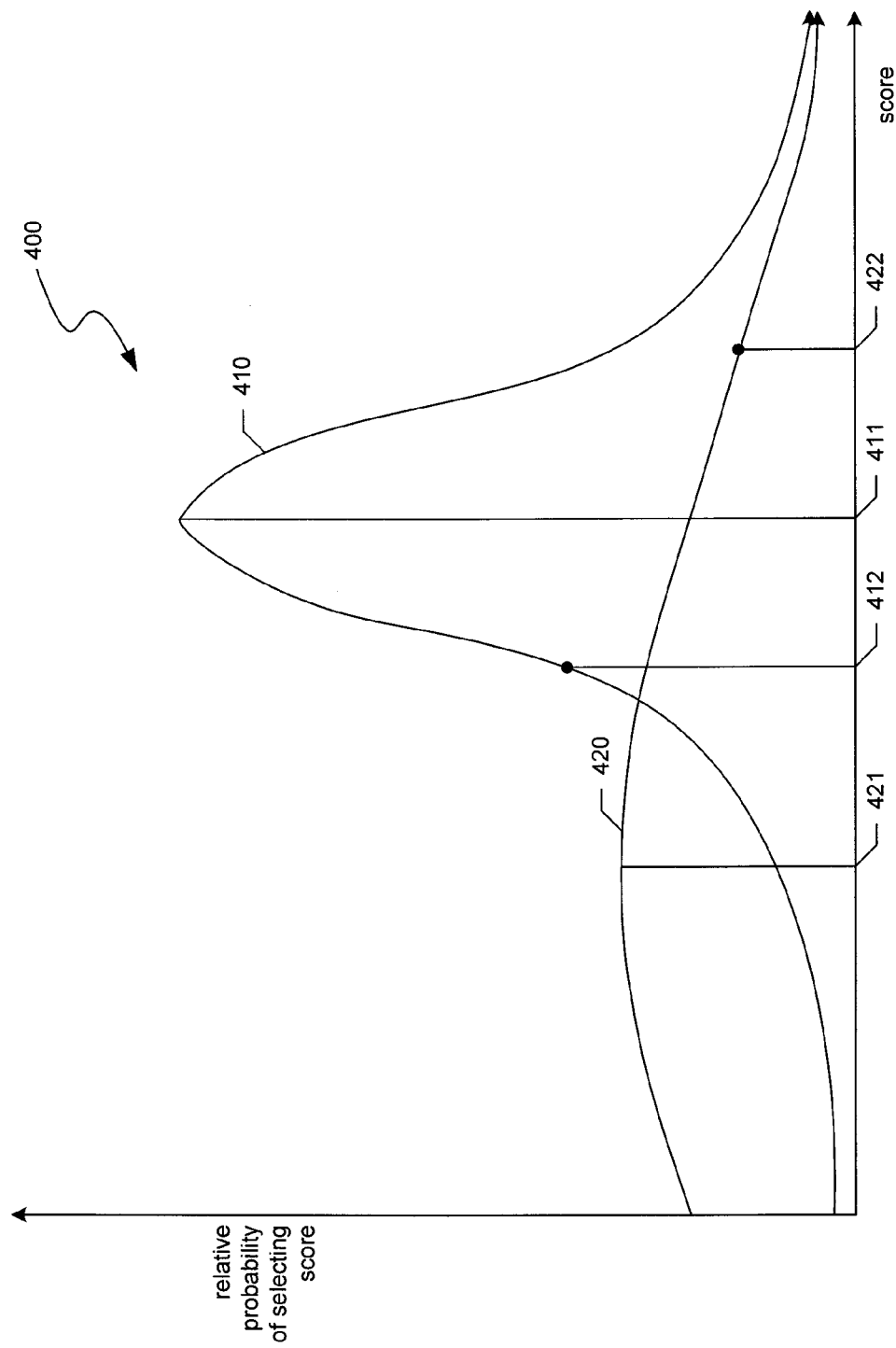
FIG. 4 is a graph showing sample normal distribution curves used by the facility to select scores for each of two candidate messages for a particular slot.

FIG. 4 is a graph showing sample normal distribution curves used by the facility to select scores for each of two candidate messages for a particular slot. In particular, the graph shows curve 410 corresponding to a first candidate message and curve 420 corresponding to a second candidate message. The height of each curve at a given score indicates the relative probability that that score will be selected for the candidate message to which the curve corresponds. The mean value 411 of curve 410 is larger than the mean value 421 of curve 420, indicating that the first message has proved to have a higher average value than the second message when presented in the slot. Curve 420, on the other hand, is broader than curve 410, indicating that the value of the second message has a higher level of variability, or "standard error," than the first message. Because the standard error metric takes into account the number of exposures of a message, this may indicate that the second message has been included in the display fewer times than the first message, perhaps because the second message has only been scheduled into the slot recently. The standard error is an inverse function of number of exposures, and a direct function of the total variations in the message's value. Thus, the standard error is large when a message is first introduced to a slot, and tends to decline thereafter, except for messages that exhibit erratic performance. Further, the mean value adjusts over time to reflect the current average of the value produced by exposures of the message in the slot.

The graph also shows sample scores for these two messages, selected at random within the area of each of the curves. On one hand, the higher mean of curve 410 causes the first message to be scored higher than the second message in the majority of cases in which the two messages are competing for a slot. On the other hand, the greater breadth of curve 420 ensures that the second message will be scored higher than the first message in at least a small number of cases in which the two messages are competing for the same slot. It can be seen that, in this case, the score 422 determined by the facility for the second message is larger than the score 412 selected for the first message, causing the second message to be included in the display ahead of the first message, despite the first message's higher mean value. As the second message is included in the display in subsequent instances of the page containing the slot, its standard error will likely decrease, reducing its likelihood of selection relative to candidates like the first message unless these additional exposures create significant value, increasing its mean value.

Figure 5:
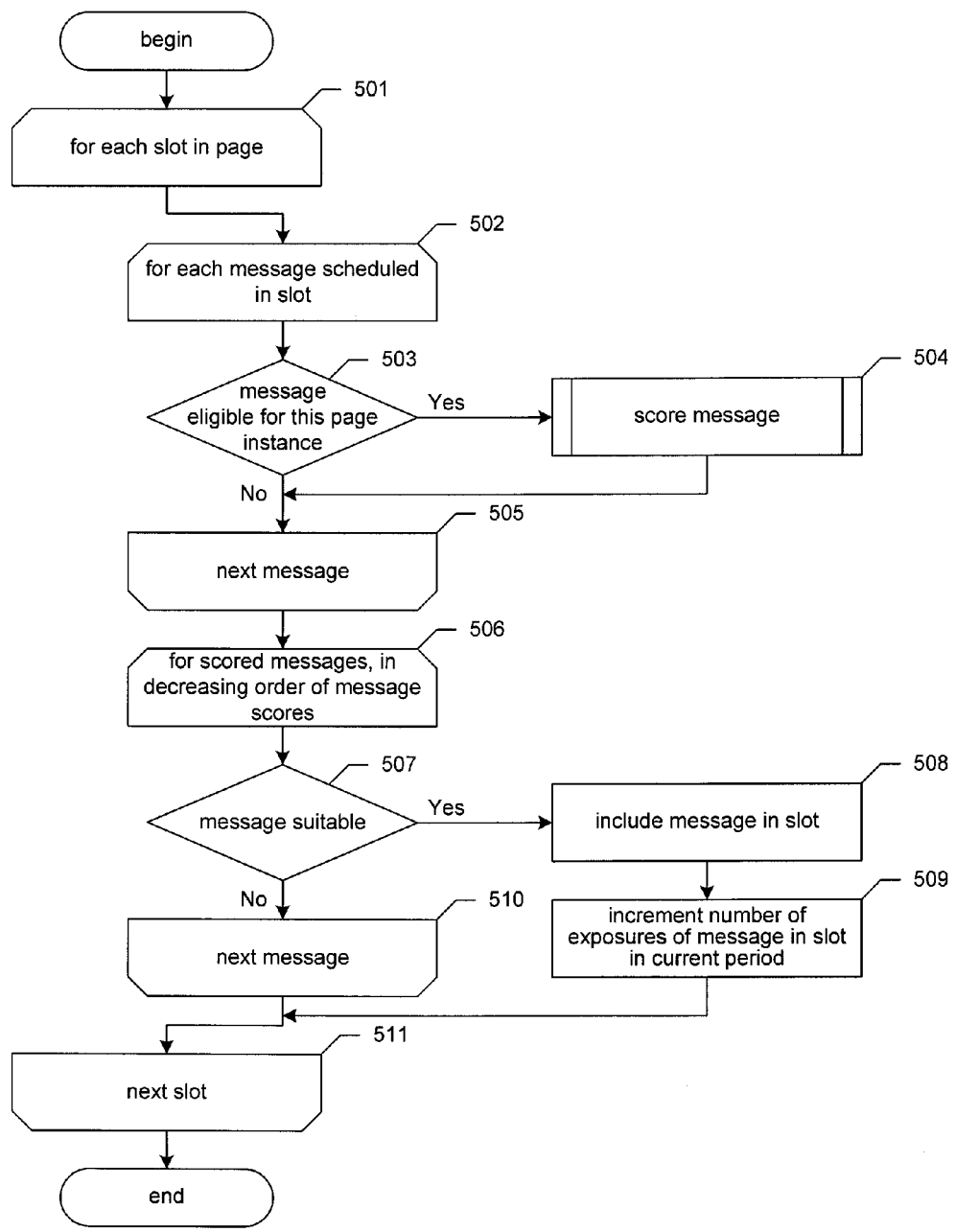
FIG. 5 is a flow diagram showing a routine performed by the facility in order to select messages to include in displays contained in a requested page in some embodiments.

FIGS. 5-8 are flow diagrams showing various operational routines performed by some embodiments of the facility. FIG. 5 is a flow diagram showing routine performed by the facility in order to select messages to include in displays contained in a requested page in some embodiments. In blocks 501-510, the facility loops through each slot in the page to determine which message to display in that slot. In blocks 502-509, the facility loops through each message scheduled in the slot to determine which of the scheduled message will be displayed in each particular slot for an instance of a requested page. At decision block 503, the facility determines whether the message is eligible for this instance of the page. If the facility determines that the message is eligible for this instance of the page, then the facility continues in block 504, else the facility continues in block 505. In block 504, the facility scores the message for the slot. Block 504 is discussed below in greater detail in connection with FIG. 6. After block 504, the facility continues in block 505. In block 505, if additional messages remain to be processed, then the facility returns to block 502 to select the next message, else the facility continues in block 506.

After each eligible message has been scored at block 504, in blocks 506-509, the facility loops through each message scored in step 504 in decreasing order of their scores until a message is selected for inclusion in the instance of the page. At decision block 507, the facility determines whether the message is suitable for this instance of the page. In some embodiments, the facility makes this determination by calling a suitability-checking routine associated with the message. If the facility determines that the message is suitable for this instance of the page, the facility continues to block 508, else the facility continues in block 509. If the facility determines at block 507 that the message is suitable for this instance of the page, at block 508 the facility includes the message in the slot. In block 509, the facility increments the number of exposures of the message in the slot performed during the current tracking period to reflect the inclusion of the message in the slot in block 508. In some embodiments (not shown), in block 509, the facility instead stores an indication that the message has been exposed in the slot, and at a later time counts the number of such indications that were stored. After block 509, the facility continues in block 511.

In some embodiments, the facility performs blocks 506-510 in a different software subsystem and/or in a different computer system than blocks 502-505. Where this is the case, the entity performing blocks 502-505 provides, in various embodiments, various sets of messages to the entity performing blocks 506-510. For example, the first entity may provide a certain number of messages, or a group of messages in decreasing order of message scores up to a message that is known to be suitable for inclusion in the slot, such as a message with which no suitability test or suitability-checking routine is associated. In some embodiment, the second entity reports the identity of the message included in the slot in block 508 for inclusion in the statistics maintained and used by the facility.

In block 510, if additional messages remain to be processed, then the facility continues in block 506 to select the next message, else the facility continues in block 510. In block 510, if additional slots remain to be processed, then the facility continues in block 501 to select the next slot, else the routine concludes.

Those skilled in the art will appreciate that the routine shown in FIG. 5 and each of the routines discussed below may be altered in a variety of ways. For example, the order of the routines may be rearranged; some portions of the routine may be performed in parallel, omitted, additional functionality may be included, etc.

Figure 6:
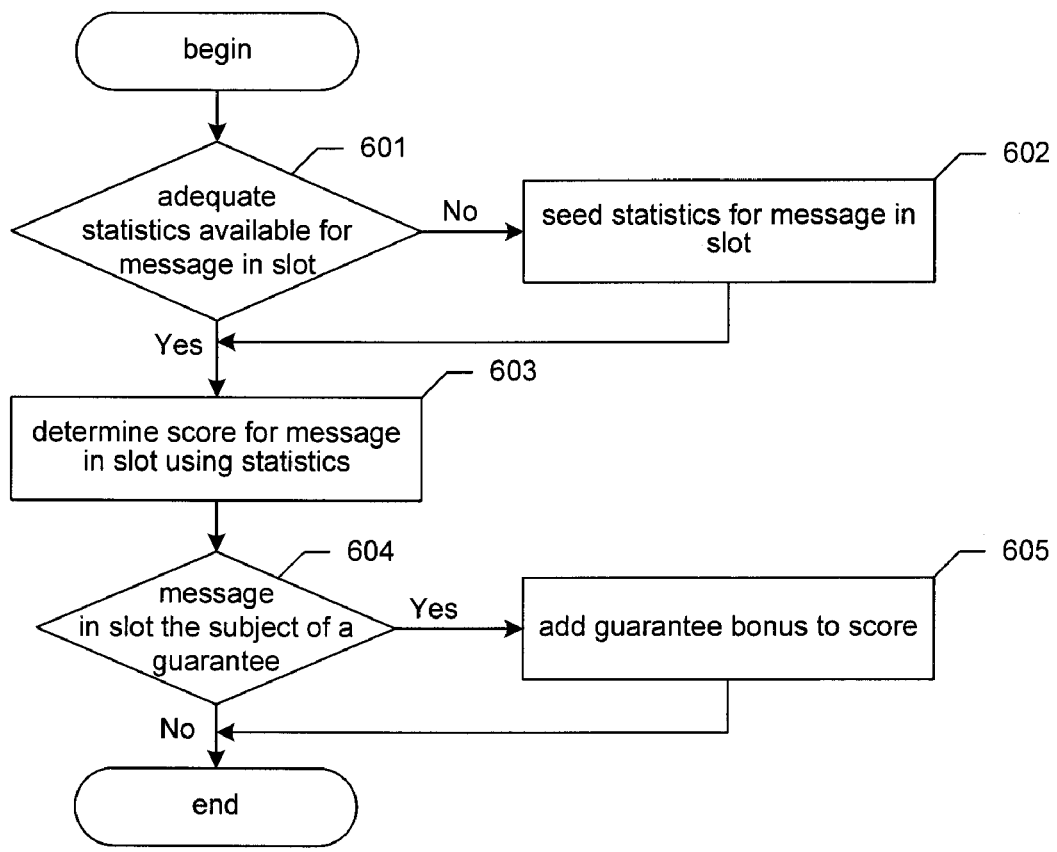
FIG. 6 is a flow diagram showing a routine performed by the facility in order to score a message for slot in some embodiments.

FIG. 6 is a flow diagram showing a routine typically performed by the facility in order to score a message for a slot, as referenced above with respect to block 504 (FIG. 5). At decision block 601 it is determined whether adequate statistics are available for the performance of the message in the slot. If adequate statistics are available, then the facility continues to block 603, else the facility continues to block 602. In block 602, the facility seeds performance statistics for the message in the slot. The details of block 602 are discussed in greater detail below. After block 602, the facility continues to block 603.

At block 603 the facility determines a score for the combination of the message and the slot using statistics about the performance of the message in the slot. In particular, in some embodiments, the facility uses the following series of formulas to determine a score for a message in the slot. The total value S produced by the message in the slot is obtained from x, the value produced by each exposure:

$$S_t = \Sigma x$$

The expected value EV is obtained from S and the number of exposures of the message in the slot N:

$$EV_t = \frac{S_t}{N_t}$$

The sum of squares SS is obtained from x and EV:

$$SS_t = \Sigma(x - EV_t)^2$$

The standard deviation SD is obtained from SS and N:

$$SD_t = \sqrt{\frac{SS_t}{N_t - 1}}.$$

The standard error SE is obtained from SD and N:

$$SE_t = \frac{SD_t}{\sqrt{N_t}}$$

As is described in greater detail below in connection with FIG. 8, the above calculations can be performed in advance for each combination of slot and message, rather than being repeated each time the facility determines a score. Finally, the score is obtained from EV and SE:

$$score_p = EV_p + (SE_p * normrand())$$

where normrand( ) is a function that returns a number chosen from a normal distribution with μ=0 and σ=1. In some embodiments, the facility implements normrand( ) by mapping the output of a random number generator onto a normal distribution, such as by mapping the output of the random number generator variate_generator onto a normal distribution normal_distribution, both provided as part of the Boost library available from and documented at http://www.boost.org/index.htm.

In decision block 604, the facility determines whether the message in this slot is the subject of a guarantee. If the facility determines that the message in the slot is the subject of a guarantee, then the facility continues in block 605, else the routine concludes. In block 605, the facility adds a guarantee bonus determined by the facility to the score determined in block 603. The facility's approach to determining this guarantee bonus is discussed in greater detail below in connection with FIG. 8. After block 605, the routine completes.

The facility seeds performance statistics for the message in the slot in block 602 as follows. In some embodiments, the facility seeds these statistics in the local context of filling the slot for the current page instance, selecting a seeded mean value equal to the average mean value of the other current candidates for the slot, and a seeded standard error equal to the average standard error of the other current candidates for the slot. In some embodiments, the facility seeds these statistics based on an overview of recent exposures of the slots. As one example, in some embodiments the facility uses the expression $$\frac{\sum_{d=1}^{30} \sum_{h=0}^{23} \sum_{p=1}^{n} i_{dhp} s_{dhp}}{\sum_{d=1}^{30} \sum_{h=0}^{23} \sum_{p=1}^{n} i_{dhp}}$$

where $s_{dhp}$ represents the value of a given statistic (weight or confidence) for a placement p in hour h and day d. $i_{dhp}$ is the number of impressions seen by placement p in hour h and day d. n is the number of unique placements shown in hour h and day d.

Figure 7:
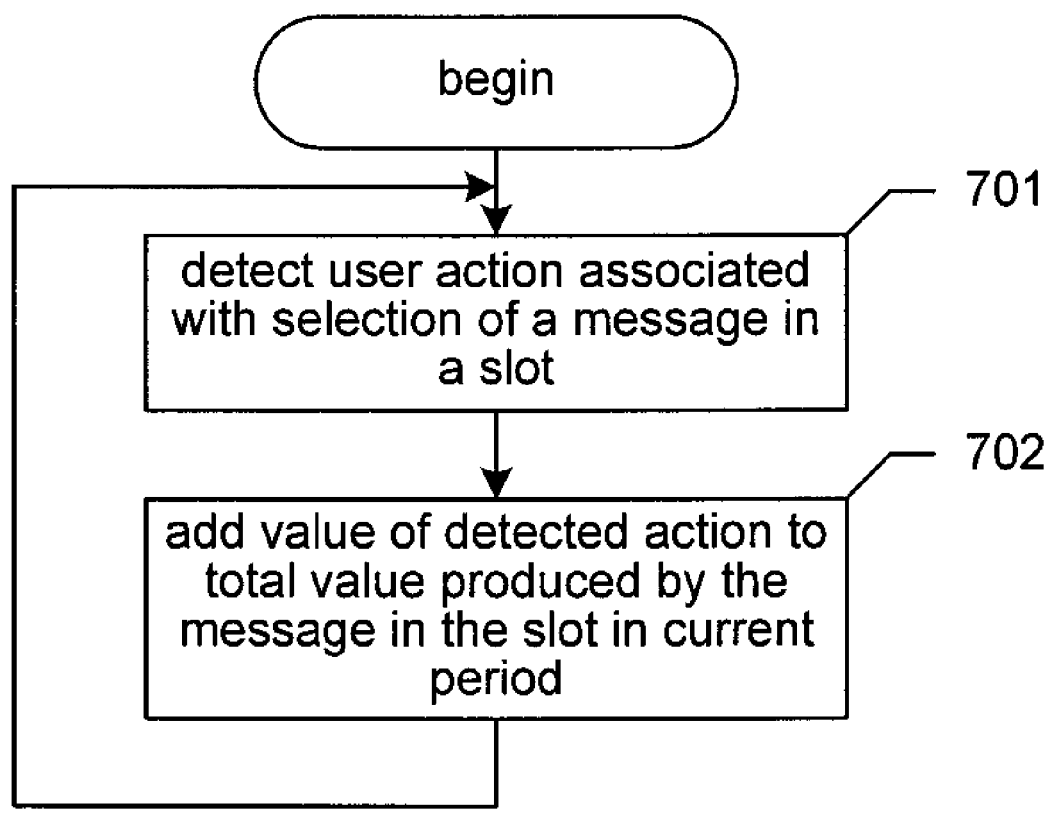
FIG. 7 is a flow diagram showing a routine performed by the facility to track the value produced by the exposure of particular messages in particular slots in some embodiments.

FIG. 7 is a flow diagram showing a routine performed by the facility to track the value produced by the exposure of particular messages in particular slots in some embodiments. In block 701, the facility detects a user action associated with selection of a message in a slot. As discussed above in connection with FIG. 2, the detected action may be the message selection itself, or any subsequent action to which the advertiser, the publisher, or another party ascribes a positive value. In block 702, the facility adds the value ascribed to the action detected in block 701 to a total value produced by the message in the slot during the current tracking period. After block 702, the facility continues in step 701 to detect the next user action.

Figure 8:
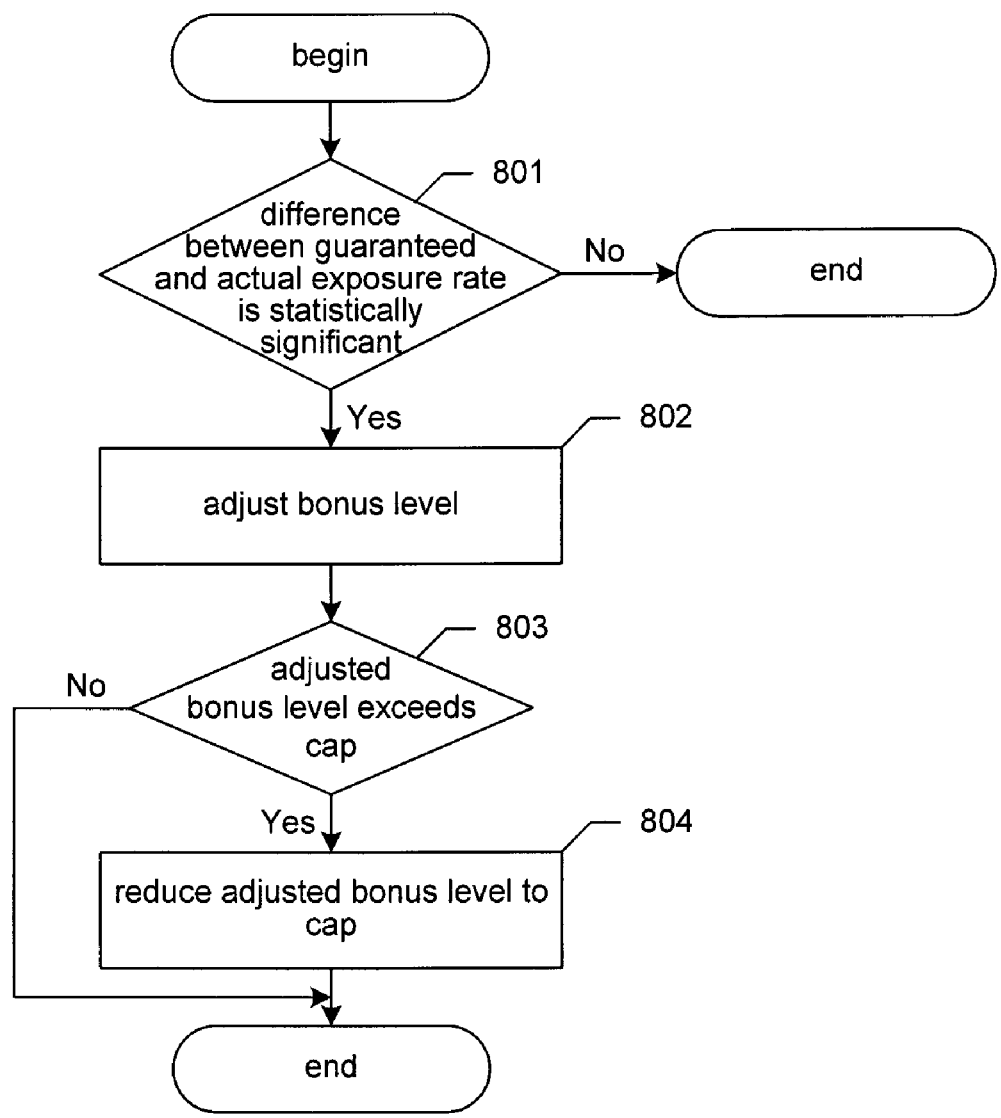
FIG. 8 is a flow diagram showing a routine performed by the facility in order to maintain the bonus associated with a guarantee in some embodiments.

FIG. 8 is a flow diagram showing a routine performed by the facility in order to maintain the bonus associated with a guarantee in some embodiments. In some embodiments, the facility periodically performs the routine described with respect to FIG. 8 for each guarantee. At decision block 801, the facility determines whether the difference between the guaranteed and actual exposure rate for the message are statistically significant. If the facility determines that the guarantee and the actual exposure rate for the message are statistically significant, then the facility continues to block 802, else the routine concludes. In particular, in some embodiments, the facility determines that the difference is statistically significant if the following test evaluates as false:

$$|R_T - R_{i-1}| \leq 1.96 * \sqrt{R_{i-1} * \frac{1 - R_{i-1}}{N}}$$

where:
$R_A$=exposure count+eligibility rate
$R_T$=the target exposure rate
$R_{i-1}$=the $R_A$ value for the past iteration
$D_{i-1}$=the bonus in effect for the past iteration
$D_i$=the bonus generated for the current iteration
N=the number of exposures during the past iteration
μ=Metrics-provided μ for the placement
$D_H$=the bonus setting at the high end of the bracket, initially 0
$D_L$=the bonus setting at the low end of the bracket, initially ∞
$R_H$=the $R_A$ generated by $D_H$
$R_L$=the $R_A$ generated by $D_L$ In block 802, the facility adjusts the bonus level. In particular, in some embodiments, the facility adjusts the bonus level as follows:
Select Mode
1. If bracket not established ($D_L$ or $D_H$ is null), explore
2. If bracket has inverted or collapsed ($D_L$>=$D_H$), explore
3. If target not in bracket ($R_H$<$R_T$ or $R_L$>$R_T$), explore
4. Scan the recent tuning history to find the lowest and highest observed rates in it 5. If the recent history brackets $R_T$, anneal
6. Scan recent history to see if we have had any tuning cycle where the error (difference from $R_T$) increased
7. If any tuning stage increased error, explore
8. Anneal
Find Initial Pace—Exploration Mode
if (1st time)
    //no $D_{i-1}$ or $R_{i-1}$ available
    anchor=avg μ of top 3 competitors;
    pace=($μ_{king}$–anchor)*max($R_T$, baseRate); //baseRate=0.25
else
    anchor=μ+$D_{i-1}$;
    pace=|($μ_{king}$–anchor)*($R_{i-1}$–$R_T$)|;
if (pace<$μ_{king}$*initPaceSize)
    pace=$μ_{king}$*initPaceSize; //initPaceSize=0.005
Update Existing Pace—Exploration Mode
if ($R_T$>2*$R_{i-1}$)
    inc=pace;
else
    inc=pace*

$$\left|\frac{R_T - R_{i-1}}{R_{i-1}}\right|;$$

if (inc>pace)
    inc=pace;
else if (inc<minPaceSize*pace)
    inc=minPaceSize*pace; //minPaceSize=0.01
pace=pace+inc;
Set New Bonus—Exploration Mode
if ($R_{i-1}$<$R_T$)
    $D_i$=anchor+pace;
else
    $D_i$=anchor–pace;
if ($D_i$<0)
    $D_i$=0;
Anneal Mode
//reset the pace so it must be calculated afresh the next time we explore
anchor=0;
pace=0;

$$D_i = D_L + (D_H - D_L) * \frac{R_T - R_L}{R_H - R_L}$$

In some embodiments, the facility tracks ages for $D_H$ and $D_L$. Each time the facility changes the value of $D_H$, the facility increments a counter for $D_L$. Similarly, each time the facility changes the value of $D_L$, the facility increments a counter for $D_H$. During the annealing process, the facility tests these counters to see either one exceeds a staleness threshold. In cases where one of the counters does exceed the staleness threshold, the facility bypasses the annealing process for one iteration to reestablish the bonus level at the stale end of the bracket. If the facility was engaged in a long, one-sided annealing, then the exposure during this iteration is likely to be similar to that during the last iteration, and the facility resumes annealing with greater confidence in the next iteration. On the other hand, if the target bonus level has escaped the bracket, on the next iteration the facility collapses the bracket and returns to explore mode.

In block 803, if the bonus level as adjusted in block 802 exceeds a predetermined cap, then the facility continues in block 804, else the routine concludes. In block 804, the facility reduces the adjusted bonus level produced in block 804 to be equal to the cap. After block 804, the routine concludes.

Figure 9:
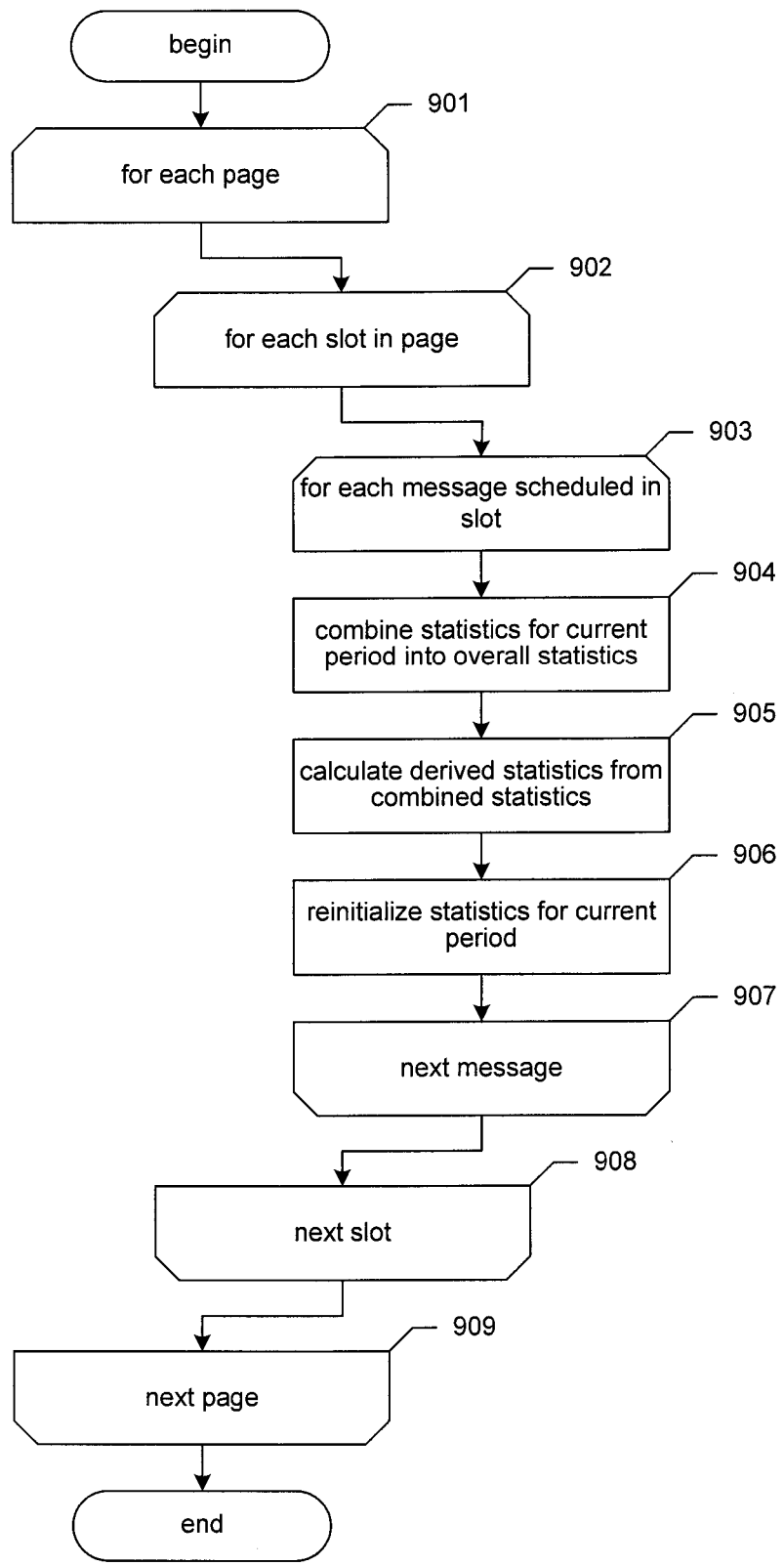
FIG. 9 is a flow diagram showing a routine performed by the facility in order to combine statistics collected during the current period into the overall statistics maintained and used by the facility in some embodiments.

FIG. 9 is a flow diagram showing a routine performed by the facility in order to combine statistics collected during the current period into the overall statistics maintained and used by the facility in some embodiments. In blocks 901-909, the facility loops through each page containing at least one slot. In blocks 902-908, the facility loops through each slot in the page. In blocks 903-907, the facility loops through each message scheduled into the slot. In block 904, the facility combines the statistics for the slot and message from the current period into the overall statistics for the slot and message. In particular, in some embodiments, the facility employs the following approach:

The facility weights the data points in the mean and standard error formulas based on their age. In practice, it is possible to store accumulated values and derive current values without revisiting the entire history. The following decomposes the formulas for mean, standard deviation, and standard error, showing how the weight decay is to be applied over time. Formulas follow for mean expected value EV, standard deviation SD, and standard error SE, at time t, where x is a computed value of an impression during time interval t:

$$S_t = \sum x$$

$$EV_t = \frac{S_t}{N_t}$$

$$SD_t = \sqrt{\frac{SS_t}{N_t - 1}}$$

$$SE_t = \frac{SD_t}{\sqrt{N_t}}$$

To compute historical decay, the facility tracks three values for each campaign placement: the weighted count WN, the weighted sum WS, and the weighted sum-of-squares of the variance WSS. The values computed for time interval t are computed from the previous time interval's values as shown:

$$WN_t = N_t + d_t WN_{t-1}$$

$$WS_t = S_t + d_t WS_{t-1}$$

$$WSS_t = SS_t + d_t WSS_{t-1}$$

where $d_t$ refers to the decay factor chosen for time interval t.

In block 905, the facility calculates derived statistics from the combined statistics produced in block 904. In particular, the routine may use the formulas below to obtain weighted expected value, standard deviation, and standard error for any given time interval:

$$WEV_t = \frac{WS_t}{WN_t}$$

$$WSD_t = \sqrt{\frac{WSS_t}{WN_t - 1}}$$

$$WSE_t = \frac{WSD_t}{\sqrt{WN_t}}$$

Then $WEV_t$ and $WSE_t$ are used to drive the bidding algorithm during time interval t. The facility determines $d_t$ as follows:

1. Let d' be $d_{t-1}$.
2. Compute the overall value, as computed by the simulation model, for cases d'+ϵ, d', and d'−ϵ.
3. If the model output for d'+ϵ has the largest value, set d' to d'+ϵ, and go to step 2.
4. If the model output for d'−ϵ is largest, set d' to d'−ϵ, and go to step 2.
5. Set $d_t$=d'.

In some embodiments, rather than dynamically computing $d_t$ as described above, the facility instead uses a fixed value for $d_t$.

In block 906, the facility re-initializes the statistics for the current period in order to prepare them to receive data from the next period. In block 907, if additional messages remain to be processed, the facility returns to block 903 to select the next message, else the facility continues in block 908. In block 908, if additional slots remain to be processed, than the facility returns to block 902 to select the next slot, else the facility continues in block 909. In block 909, if additional pages remain to be processed, the facility continues to block 901 to select the next page, else the routine concludes.

In some embodiments, the facility includes functionality for handling unsatisfiable schedules, where more than 100% of the available exposures of a slot have been promised via guarantees to display messages in that slot. Here, the facility seeks "fairness" by equally penalizing the guaranteed messages. In some embodiments, the facility maintains a guarantee satisfaction state for each guarantee. The facility collects statistics that reflect whether the message is receiving the exposure rate specified by its guarantee over two periods: the lifetime of the message's scheduling in its slot, and a trailing 12-hour window. If the specified exposure rate is satisfied for both of these time periods, the facility attributes a "happy" state to the guarantee. If the exposure specified by the guarantee is not satisfied over either of these two time periods, then the facility attributes an "unhappy" state to the guarantee. When the guarantee is unhappy, the facility chooses a bonus level intended to yield an exposure rate that is calculated to make up the guarantee's shortfall over the coming 12-hour period.

In some embodiments, the facility further collects statistics to measure whether other messages that the guaranteed message is competing against would yield exposures to the guaranteed placement if the facility raised the bonus for the guaranteed placement. If a guarantee is in the unhappy state and has competitors determined by the facility to be unwilling to yield, the facility changes the state of the guarantee to "troubled." When selecting a message to display in the slot, if any eligible message is the subject of a troubled guarantee, the facility uses a message selection process that diverges from the one shown in FIGS. 5 and 6. In this process, the facility excludes from consideration any message not having a guarantee whose state is troubled. Where the eligible messages include more than one that is the subject of a troubled guarantee, the facility chooses among these in a manner proportional to the rate guarantee by each. For example, where two messages subject to troubled guarantees are eligible, the first having an 80% guaranteed rate and the second having a 40% guaranteed rate, the facility attributes a selection weight to the first that is twice as large as the selection weight attributed to the second, yielding a two-thirds probability of selecting the first and the one-third probability of selecting the second.

In some embodiments, the facility tracks the performance of some messages across two or more slots, rather than tracking the performance of the message in each of these slots individually.

It will be appreciated by those skilled in the art that the above-described facility may be straightforwardly adapted or extended in various ways. For example, the facility can be used to select content of a wide variety of types, based upon the performance of a wide variety of different actions with respect to that content, using values assigned to actions in a wide variety of ways. Also, a variety of different statistical distributions may be used to score messages or other types of content for inclusion in slots or other content containers. While the foregoing description makes reference to particular embodiments, the scope of the invention is defined solely by the claims that follow and the elements recited therein.

We claim:

1. A method for selecting an advertising message to include at a distinguished location in a distinguished instance of a web page, comprising:
    identifying a plurality of candidate advertising messages that are eligible to be included at a distinguished location in a distinguished instance of the web page;
    for each identified advertising message:
    determining, across a plurality of instances of the web page served during a foregoing period of time that included the identified advertising message in the distinguished location (a) a set of values associated with the inclusion of the identified advertising message in each of the plurality of instances of the web page; (b) an average of the values associated with the inclusion of the identified advertising message in the plurality of instances of the web page, and (c) a measure of the level of variability of the values associated with the inclusion of the identified advertising message;
    determining a score by performing a weighted random selection of a value from a normal probability distribution centered on the determined average value, wherein the breadth of the normal probability distribution is based on the determined measure of the level of variability of the values; and
    selecting the identified advertising message having the highest score to include at the distinguished location in the distinguished instance of the web page,
    wherein the method is implemented in a computing system having a processor and a memory.

2. The method of claim 1 wherein the identification is based on an identifier associated with a user who requested the distinguished instance of the web page.

3. The method of claim 1, further comprising:
    performing a test associated with the selected advertising message to determine whether the selected advertising message is suitable for inclusion at the distinguished location in the distinguished instance of the web page;
    if the performed test succeeds, including the selected advertising message at the distinguished location in the distinguished instance of the web page; and
    if the performed test fails, deselecting the selected advertising message in favor of the identified advertising message having the next-highest score.

4. A method for selecting a message to include at a distinguished location in an instance of a dynamically-published document, comprising:
    identifying a plurality of candidate messages;
    for each identified candidate message:
    determining, across a plurality of instances of documents published during a foregoing period of time that included the identified candidate message in the distinguished location (a) a measure of success associated with the inclusion of the identified candidate message in a single instance of document published (b) an average of the measure of success associated with the inclusion of the identified candidate message in the plurality of instances of documents published, and (c) a measure of a level of variability of the measure of success achieved by including the identified candidate message;

determining a score by performing a weighted random selection of a value from a probability distribution based on (a) the determined average measure of success and (b) the determined measure of the level of variability of the measure of success; and selecting at least one of the identified candidate messages to include at the distinguished location in the instance of the document based on the scores determined for the identified candidate messages, wherein the method is implemented in a computing system having a processor and a memory.

5. The method of claim 4 wherein an exposure guarantee is associated with one of the identified candidate messages, and wherein, before the determined measure of the level of variability of the level of success is used as a basis for the probability distribution for the candidate message with the associated exposure guarantee, the determined average measure of success of the candidate message with the associated exposure guarantee is augmented by a guarantee bonus value.

6. The method of claim 5, further comprising dynamically determining the guarantee bonus value by which the average measure of success of the candidate message with the associated exposure guarantee is augmented based on an estimate of the average measure of success of the candidate message with the associated exposure guarantee needed to ensure satisfaction of the exposure guarantee.

7. The method of claim 4 wherein a plurality of the identified candidate messages are each the subject of an exposure guarantee, and wherein, at a time when at least one of the exposure guarantees is not satisfied, the selection of any identified candidate messages that are not the subject of an exposure guarantee is precluded.

8. The method of claim 4 wherein the plurality of candidate messages are identified from a pool of messages associated with the distinguished location, the method further comprising, for each of the messages of the pool, decaying information on which (a) the determined average level of success and (b) the determined measure of the level of variability of the measure of success of the message is based on older such information is given less weight than newer such information.

9. The method of claim 8, further comprising dynamically determining a rate of decay used to decay the determined average measure of success and the determined measure of the level of variability of the level of success of the messages.

10. The method of claim 9 wherein the rate of decay is determined by:
for each of a plurality of different posited rates of decay, simulating the selection of messages using determined average levels of success and determined measures of the level of variability of the measure of success decayed at the posited rate of decay; and
selecting the posited decay rate whose simulation produces a highest total level of success.

11. The method of claim 4 wherein a distinguished one of the identified candidate messages has been included at the distinguished location in less than a threshold number of instances of the document,
and wherein the average measure of success determined for the distinguished identified candidate message is a constructive average level of success based on an aggregate average level of success of all messages included at the distinguished location in the document during a preceding period of time,
and wherein the measure of the level of variability of the level of success determined for the distinguished identified candidate message is a constructive measure of the level of variability of the level of success based on an average measure of the level of variability of the level of success of all messages included at the distinguished location in the document during the preceding period of time.

12. The method of claim 4 wherein a distinguished one of the identified candidate messages has been available for inclusion at the distinguished location in the document for less than a length of time,
and wherein the average measure of success determined for the distinguished identified candidate message is a constructive average level of success based on an aggregate average level of success of all messages included at the distinguished location in the document during a preceding period of time,
and wherein the measure of the level of variability of the measure of success determined for the distinguished identified candidate message is a constructive measure of the level of variability of the measure of success based on an average measure of the level of variability of the measure of success of all messages included at the distinguished location in the document during the preceding period of time.

13. The method of claim 4 wherein a distinguished one of the identified candidate messages has been available for inclusion at the distinguished location in the document for less than a length of time,
and wherein the average measure of success determined for the distinguished identified candidate message is a constructive average level of success based on an aggregate average measure of success of all messages included at the distinguished location in the document at least a threshold number of times during a preceding period of time,
and wherein the measure of the level of variability of the measure of success determined for the distinguished identified candidate message is a constructive measure of the level of variability of the measure of success based on an average measure of the level of variability of the measure of success of all messages included at the distinguished location in the document at least a threshold number of times during the preceding period of time.

14. A system for selecting a unit of content to include in a distinguished instance of a content container, comprising:
a computing system having a processor and memory for implementing an analysis subsystem that determines, for each of a plurality of units of content, across a plurality of instances of the content container distributed during a foregoing period of time that included the unit of content (a) a measure of success achieved by including the unit of content in one instance of the content container (b) an average of the measure of success achieved by including the unit of content across the plurality of instances of the content container, and (c) a measure of the level of variability of the levels of success achieved by including the unit of content;
a computing system having a processor and memory for implementing a scoring subsystem that determines a score for each of a plurality of units of content by performing a weighted random selection of a value from a probability distribution based on (a) the determined average measure of success and (b) the determined measure of the level of variability of the measure of success; and a selection subsystem that selects at least one of the units of content to include in the distinguished instance of the content container based on the scores determined for units of content.

15. The system of claim 14 wherein the content container is a portion of a web page.

16. The system of claim 14 wherein the selected unit of content is an advertising message.

17. The system of claim 14, further comprising a guarantee subsystem that, for a unit of content having an exposure guarantee, augments by a guarantee bonus value the average measure of success determined for the unit of content by the analysis subsystem before its use by the scoring subsystem to determine a score for the unit of content.

18. The system of claim 14 wherein the selection subsystem selects the unit of content having the highest determined score.

19. The system of claim 14 when the selection system selects a unit of content to include in the distinguished instance of the content container by, for each of the plurality of units of content in decreasing order of their scores, until a unit of content is selected:
applying a suitability test associated with the unit of content; and selecting the unit of content if the applied suitability test is satisfied.

20. The system of claim 14 wherein the analysis subsystem maintains (a) the determined average measure of success and (b) the determined measure of the level of variability of the level of success for the plurality of units of content over time to take into account the inclusion of units of content of the plurality in the additional instances of the content container and associated measure of success.

21. The system of claim 14 wherein the analysis subsystem determines, for at least one the plurality of units of content, across a plurality of instances of both the content container and an alternate content container distinct from the content container distributed during a foregoing period of time that included the unit of content, both (a) an average of a measure of success achieved by including the unit of content, and (b) a measure of the level of variability of the level of success achieved by including the unit of content.

\* \* \* \* \*

UNITED STATES PATENT AND TRADEMARK OFFICE
CERTIFICATE OF CORRECTION

| | | |
|---|---|---|
| PATENT NO. | : 8,219,447 B1 | |
| APPLICATION NO. | : 11/758932 | |
| DATED | : July 10, 2012 | |
| INVENTOR(S) | : Ieong et al. | |

It is certified that error appears in the above-identified patent and that said Letters Patent is hereby corrected as shown below:

On the Title page (item 56 page 2) at line 39, Change "Personalizaing" to --Personalizing--.

In column 5 at line 7, Change "that that" to --that--.

In column 16 at line 15, In Claim 21, change "one" to --one of--.

Signed and Sealed this
Twenty-fifth Day of December, 2012

David J. Kappos
*Director of the United States Patent and Trademark Office*